United States Patent
Gonen et al.

(10) Patent No.: US 10,356,073 B2
(45) Date of Patent: Jul. 16, 2019

(54) SECURE CAPTCHA TEST

(71) Applicant: Cisco Technology, Inc., San Jose, CA (US)

(72) Inventors: Gil Gonen, Jerusalem (IL); Ronen Haber, Jerusalem (IL); Arie Haenel, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 15/249,493

(22) Filed: Aug. 29, 2016

(65) Prior Publication Data

US 2018/0063107 A1 Mar. 1, 2018

(51) Int. Cl.
*H04L 29/06* (2006.01)
*G06F 3/14* (2006.01)
(Continued)

(52) U.S. Cl.
CPC ............. *H04L 63/08* (2013.01); *G06F 3/14* (2013.01); *G06F 21/31* (2013.01); *G09G 5/14* (2013.01);
(Continued)

(58) Field of Classification Search
CPC ......... H04L 63/08; H04L 63/18; G09G 5/363; G09G 5/377; G09G 5/38; G06F 2221/2103; G06F 2221/2133
See application file for complete search history.

(56) References Cited

U.S. PATENT DOCUMENTS 7,149,899 B2 * 12/2006 Pinkas .................... G06F 21/36
                                                    713/182
7,383,570 B2 *  6/2008 Pinkas .................... G06F 21/34
                                                    726/1
(Continued)

FOREIGN PATENT DOCUMENTS

WO    WO2010/014386    2/2010

OTHER PUBLICATIONS

Daher—"POSH-A Generalized Captcha with Security Applications," Oct. 27, 2008, pp. 1-10, ACM.*
(Continued)

*Primary Examiner* — Luu T Pham
*Assistant Examiner* — James J Wilcox

(57) ABSTRACT

In one embodiment, a system including a processor to run a web browser application and a CAPTCHA challenge application, wherein the web browser application is operative when run to retrieve and present a web page of a website, obtain a request from the website requesting performance of a CAPTCHA challenge process, and request the CAPTCHA challenge application to perform the CAPTCHA challenge process, the CAPTCHA challenge application is operative when run to request a CAPTCHA challenge test from an authentication server, obtain the CAPTCHA challenge test, render a CAPTCHA window including the CAPTCHA challenge test, obtain a user response to the CAPTCHA challenge test, send a value based on the user response to the authentication server, and obtain a response from the authentication server authenticating the user response, and the CAPTCHA challenge application and the web browser application are run as different processes by the processor.

20 Claims, 3 Drawing Sheets

(51) Int. Cl.
  *G06F 21/31* (2013.01)
  *G09G 5/14* (2006.01)
(52) U.S. Cl.
  CPC ............ *H04L 63/083* (2013.01); *H04L 63/18* (2013.01); *G06F 2221/2133* (2013.01); *G09G 2340/0464* (2013.01); *G09G 2340/12* (2013.01); *G09G 2358/00* (2013.01)

(56) References Cited

U.S. PATENT DOCUMENTS

| | | | | |
|---|---|---|---|---|
| 7,552,467 | B2* | 6/2009 | Lindsay | G06F 21/31 713/165 |
| 7,584,223 | B1* | 9/2009 | Pinkas | G06F 17/30702 |
| 8,346,672 | B1 | 1/2013 | Weiner et al. | |
| 8,397,275 | B1 | 3/2013 | Magdsick | |
| 8,548,139 | B2* | 10/2013 | Dahl | H04L 29/12094 348/14.01 |
| 8,572,381 | B1* | 10/2013 | Kraemer | G06F 21/604 713/170 |
| 8,635,692 | B2* | 1/2014 | Gentner | G06Q 10/107 726/22 |
| 8,701,183 | B2 | 4/2014 | Mualem et al. | |
| 8,745,694 | B2* | 6/2014 | Griffin | G06F 21/36 713/168 |
| 8,769,641 | B2* | 7/2014 | Griffin | H04L 9/3226 726/2 |
| 8,850,566 | B2 | 9/2014 | Freund et al. | |
| 8,863,271 | B2* | 10/2014 | Griffin | G09C 5/00 726/16 |
| 8,931,083 | B2* | 1/2015 | Griffin | G06F 21/36 726/19 |
| 9,361,446 | B1* | 6/2016 | Demirjian | G06F 21/36 |
| 9,424,414 | B1* | 8/2016 | Demirjian | G06F 21/36 |
| 9,452,355 | B1* | 9/2016 | Lin | A63F 13/12 |
| 9,495,532 | B1* | 11/2016 | Zhurkin | G06F 21/36 |
| 9,871,795 | B2* | 1/2018 | Demirjian | H04L 63/10 |
| 2005/0097179 | A1* | 5/2005 | Orme | H04L 51/12 709/207 |
| 2005/0239447 | A1* | 10/2005 | Holzman | H04L 63/08 455/414.3 |
| 2008/0133347 | A1 | 6/2008 | Josifovski et al. | |
| 2009/0012856 | A1 | 1/2009 | Jamal et al. | |
| 2009/0187986 | A1* | 7/2009 | Ozeki | G06F 21/36 726/21 |
| 2010/0031315 | A1* | 2/2010 | Feng | G06F 21/554 726/3 |
| 2010/0223471 | A1* | 9/2010 | Fresko | H04L 63/08 713/176 |
| 2010/0251388 | A1* | 9/2010 | Dorfman | G06F 21/36 726/29 |
| 2010/0332841 | A1* | 12/2010 | Watts | G06F 21/36 713/182 |
| 2012/0303528 | A1 | 11/2012 | Weiner et al. | |
| 2012/0323717 | A1* | 12/2012 | Kirsch | G06Q 20/0855 705/26.1 |
| 2013/0179683 | A1 | 7/2013 | Joubert et al. | |
| 2013/0219480 | A1* | 8/2013 | Bud | G06F 21/32 726/7 |
| 2014/0181529 | A1* | 6/2014 | Joyce, III | H04L 63/083 713/183 |
| 2014/0196133 | A1* | 7/2014 | Shuster | H04L 63/126 726/7 |
| 2014/0289869 | A1* | 9/2014 | Hauser | G06F 21/316 726/28 |
| 2015/0180829 | A1* | 6/2015 | Yu | G06F 21/31 726/11 |
| 2015/0180857 | A1 | 6/2015 | Schulman et al. | |
| 2015/0347741 | A1* | 12/2015 | Krstic | G06F 21/32 726/19 |
| 2015/0365401 | A1* | 12/2015 | Brown | H04L 63/0838 726/7 |
| 2016/0028742 | A1* | 1/2016 | Johns | H04L 67/34 726/26 |
| 2016/0028743 | A1* | 1/2016 | Johns | H04L 63/123 726/26 |
| 2016/0036821 | A1* | 2/2016 | Vandemar | H04L 63/102 726/4 |
| 2016/0055329 | A1* | 2/2016 | Akula | G06F 21/36 726/7 |
| 2016/0173529 | A1* | 6/2016 | Baig | H04L 63/1458 726/13 |
| 2016/0191505 | A1* | 6/2016 | Frank | G09C 5/00 726/7 |
| 2016/0191529 | A1* | 6/2016 | Brown | H04L 63/0838 726/7 |
| 2016/0205089 | A1* | 7/2016 | Ott | H04L 9/32 726/7 |
| 2016/0248763 | A1* | 8/2016 | Brown | H04L 63/0838 |
| 2016/0277930 | A1* | 9/2016 | Li | H04L 41/28 |
| 2016/0284035 | A1* | 9/2016 | Muttik | G06Q 50/18 |
| 2016/0285911 | A1* | 9/2016 | Goldman | G06F 21/31 |
| 2016/0306966 | A1* | 10/2016 | Srivastava | G06F 21/31 |
| 2017/0093864 | A1* | 3/2017 | Pestun | H04L 63/10 |
| 2017/0177884 | A1* | 6/2017 | Mehta | G06Q 10/06395 |
| 2017/0180348 | A1* | 6/2017 | Piccolotto | G06K 9/00906 |
| 2017/0346851 | A1* | 11/2017 | Drake | H04L 63/1466 |

OTHER PUBLICATIONS

Thomas—"Framework for Evaluation of Text Captchas," May 13-17, 2013, pp. 159-160, ACM.*

Egele, Manuel et al.; Captcha Smuggling: Hijacking Web Browsing Sessions to Create Captcha Farms (2010), In Proceedings of the 2010 ACM Symposium on Applied Computing (SAC '10). ACM, New York, NY. USA, 1865-1870. DOI=http://dx.doi.org/10.1145/1774068. 1774483.

Gonen, Gil et al.; Software Library That Enables Web Sites With Plugins to Continue to be Displayed on Desktop Browers That Cease Support of Plugins; IPCOM000235674D; published Mar. 19, 2014.

Kaiser, Ed. et al.; Mod Kapow: Protecting the Web With Transparent Proof-of-Work, INFOCOM Workshops 2008, IEEE, Phoenix, AZ, 2008, pp. 1-6. doi: 10.1109/INFOCOM.2008.4544602.

* cited by examiner

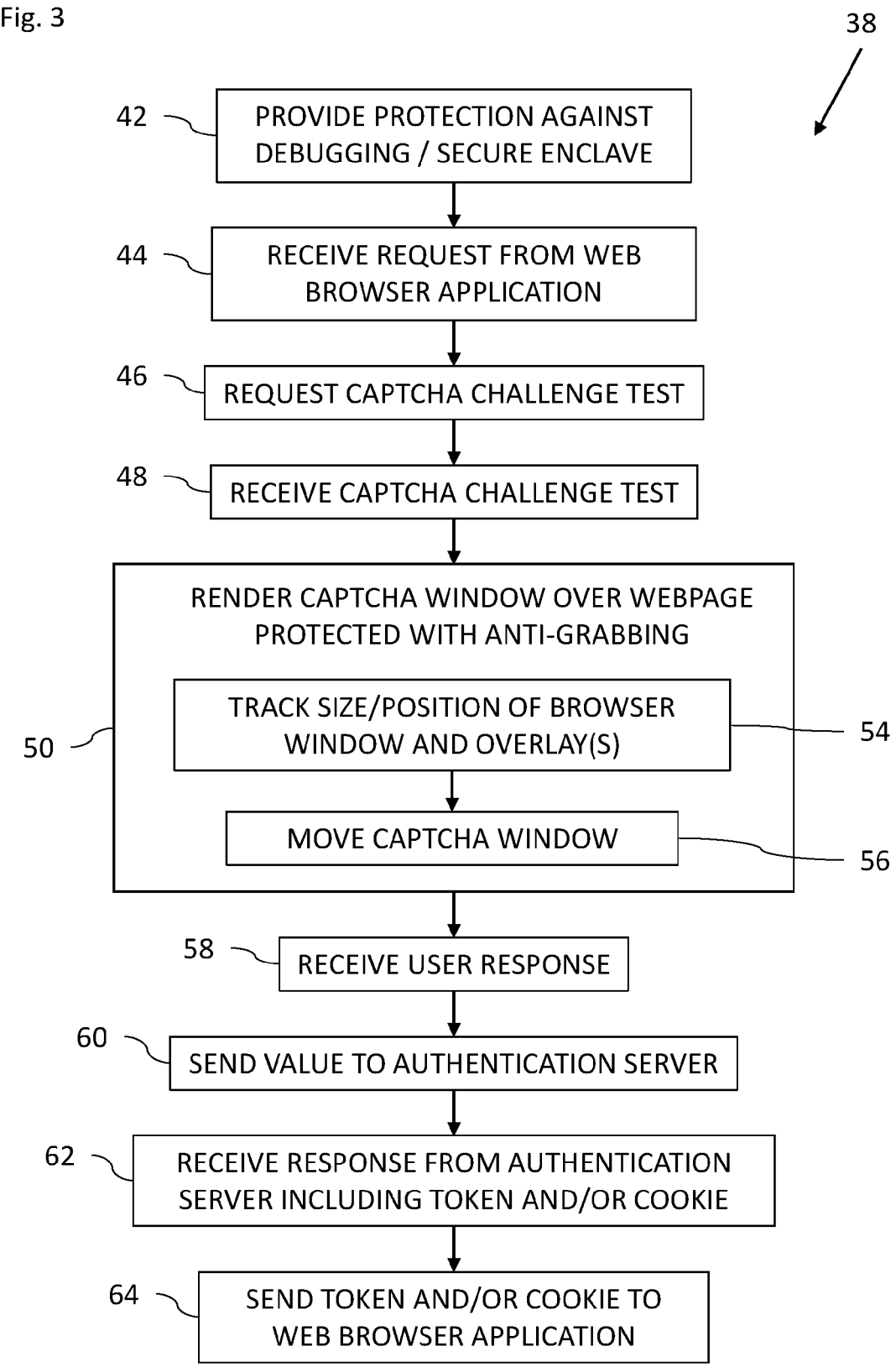

SECURE CAPTCHA TEST

TECHNICAL FIELD

The present disclosure generally relates to CAPTCHA tests.

BACKGROUND

Users have grown accustomed to using a web browser as their single and favorite interaction media for the world-wide-web. In many internet applications verification that a real human is interacting with the application is performed. A very common way to achieve this is by using a CAPTCHA test. The most common type of CAPTCHA was first disclosed in 1997 by Mark D. Lillibridge, Martin Abadi, Krishna Bharat, and Andrei Z. Broder. This form of CAPTCHA includes the user typing the letters of a distorted image, sometimes with the addition of an obscured sequence of letters or digits that appears on the screen.

BRIEF DESCRIPTION OF THE DRAWINGS

The present disclosure will be understood and appreciated more fully from the following detailed description, taken in conjunction with the drawings in which:

FIG. 3 is a flow chart showing exemplary steps in a method of operation of the CAPTCHA challenge application of FIG. 2.

DESCRIPTION OF EXAMPLE EMBODIMENTS

Overview

There is provided in accordance with an embodiment of the present disclosure, a system including a processor, and a memory to store data used by the processor, wherein the processor is operative to run a web browser application, and run a CAPTCHA challenge application, wherein the web browser application is operative when run to retrieve and present a web page of a website, obtain a request from the website requesting performance of a CAPTCHA challenge process, and in response to the website requesting performance of the CAPTCHA challenge process, request the CAPTCHA challenge application to perform the CAPTCHA challenge process, the CAPTCHA challenge application is operative when run to obtain the request from the web browser application to perform the CAPTCHA challenge process, request a CAPTCHA challenge test from an authentication server, obtain the CAPTCHA challenge test from the authentication server, render a CAPTCHA window including the CAPTCHA challenge test for output to a display device, obtain a user response to the CAPTCHA challenge test, send a value based on the user response to the authentication server, and obtain a response from the authentication server authenticating the user response, and the CAPTCHA challenge application and the web browser application are run as different processes by the processor.

DETAILED DESCRIPTION

Figure 1:
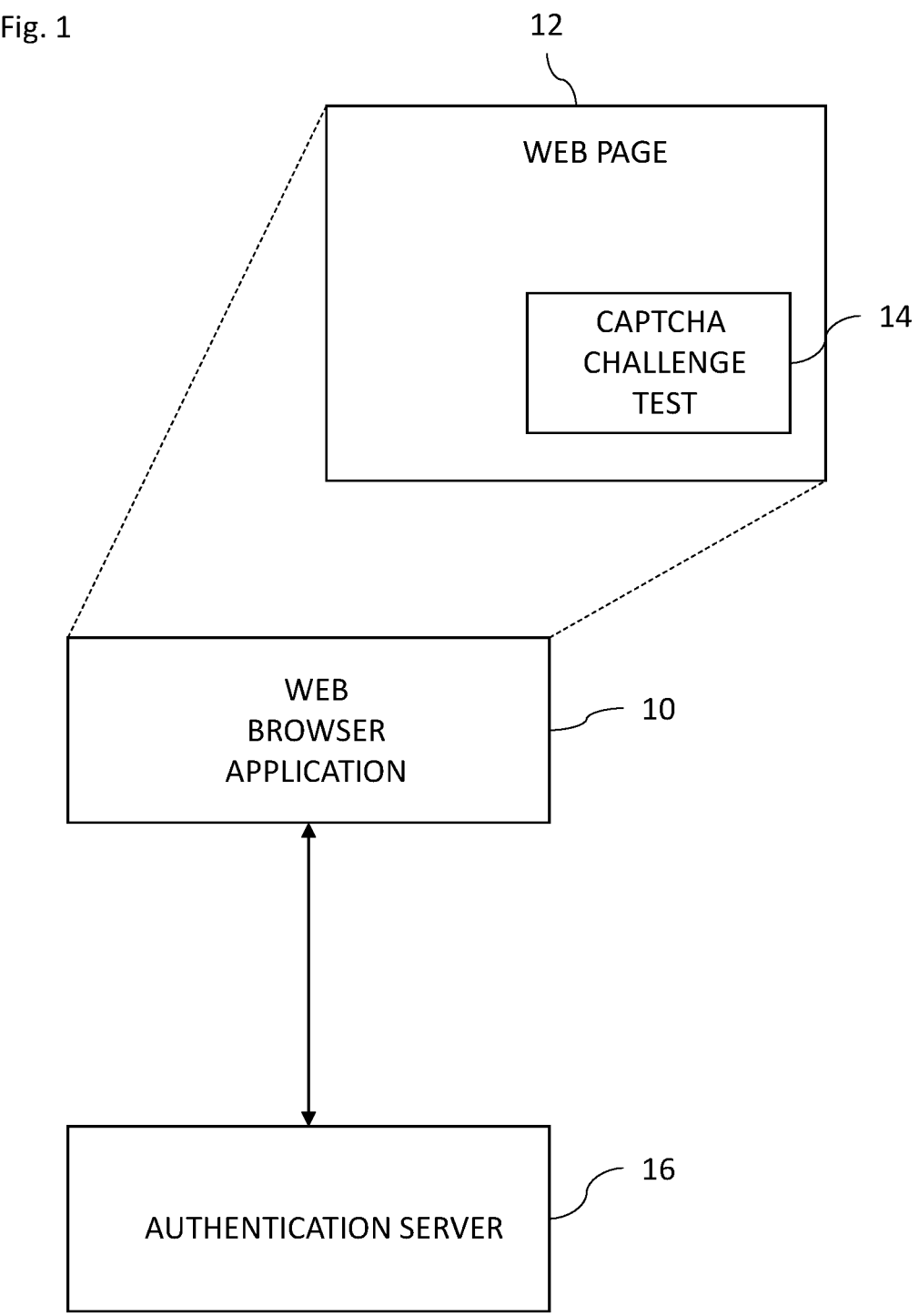
FIG. 1 is a block diagram view of web browser application running a CAPTCHA challenge test sub-process.

Reference is now made to FIG. 1, which is a block diagram view of a web-browser application 10 running a CAPTCHA challenge test sub-process. The web browser application 10 renders a web page 12 of a website (not shown). On request from the website, the web browser application 10 may process a CAPTCHA challenge test process including obtaining a CAPTCHA challenge test 14 from an authentication server 16 and rendering the CAPTCHA challenge test 14 as an integral part of the web page 12. When the CAPTCHA challenge test 14 is rendered by the web browser application 10, the ability to protect the CAPTCHA challenge test 14 is limited. For example, the CAPTCHA challenge test 14 may be vulnerable to attacks such as window grabbing followed by optical character recognition (OCR) or human labor CAPTCHA decoding followed by injecting the response to the challenge back into the web browser application 10, thus defeating the CAPTCHA's intention.

Figure 2:
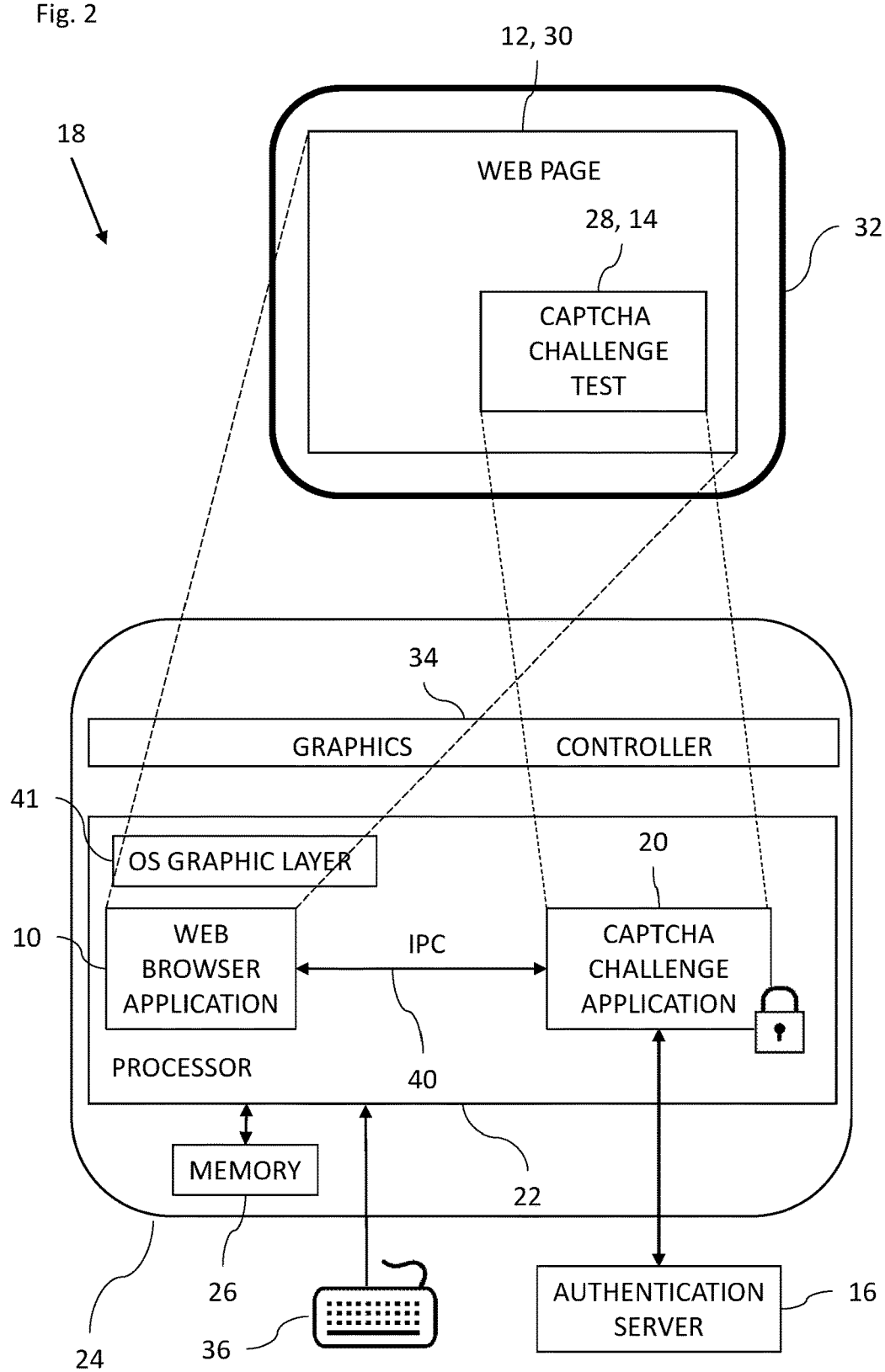
FIG. 2 is a partly pictorial, partly block diagram view of a system running a secure CAPTCHA challenge application constructed and operative in accordance with an embodiment of the present disclosure.

Reference is now made to FIG. 2, which is a partly pictorial, partly block diagram view of a system 18 running a secure CAPTCHA challenge application 20 constructed and operative in accordance with an embodiment of the present disclosure. The secure CAPTCHA challenge application 20 is run by a processor 22 of a processing device 24. The processor 22 also runs the web browser application 10. The processing device 24 also includes a memory 26 to store data used by the processor 22.

In overview, the secure CAPTCHA challenge application 20 renders a CAPTCHA window 28 via a graphics controller 34 of the processing device 24. The CAPTCHA window 28 appears to be an integral part of the web page 12 rendered by the web browser application 10. For example, when a browser window 30 including the web page 12 is moved or resized, the CAPTCHA window 28 is moved and/or resized with it. However, the CAPTCHA window 28 is controlled by the secure CAPTCHA challenge application 20 and is generally not controlled by the web browser application 10 which is a separate application from the secure CAPTCHA challenge application 20. The secure CAPTCHA challenge application 20 manages the authentication process with the authentication server 16. The CAPTCHA challenge test 14 is presented in the CAPTCHA window 28 and a user response is captured by the CAPTCHA window 28 with user input being obtained from an input device 36. This method allows implementing stronger defenses on the CAPTCHA window 28 than the web browser application 10 would allow, for example, but not limited to, Software Guard Extensions (SGX), Protected Audio-Video Path (PAVP) and Intel Insider. For example, anti-grabbing, e.g., PAVP, which protects the CAPTCHA challenge test 14 from screen capture may be employed, and anti-debugging mechanisms, e.g., SGX, may also be employed, described in more detail below. These defense technologies typically use hardware based security anchors and are designed to address attacks by an adversary who has full privileged access on the processing device 24.

The processing device 24 may be any suitable processing device, for example, but not limited to, a laptop computer, a desktop computer or a smart phone. The web page 12 and the CAPTCHA window 28 may be rendered on any suitable display device 32. The display device 32 may be integrated with the processing device 24 or may be implemented as a device separate from the processing device 24. The input device 36 may be any suitable input device which may be integrated with the processing device 24, for example, a touchscreen, or not integrated with the processing device 24, for example, a Universal Serial Bus (USB) keyboard or wireless keyboard.

Reference is now made to FIG. 3, which is a flow-chart 38 showing exemplary steps in a method of operation of the Secure CAPTCHA challenge application 20 of FIG. 2. Reference is also made to FIG. 2. The Secure CAPTCHA challenge application 20 may be provided with protection against debugging and/or may be protected by a secure enclave which is not accessible to an operating system running on the processor 22 and other applications running on the processor 22 (block 42). Secure Enclave technology (e.g. SGX) may be used for securing the communication between the secure CAPTCHA challenge application 20 and the authentication server 16. Additionally, data of the secure CAPTCHA challenge application 20 may be generally encrypted when not running on the processor 22.

The web browser application 10 is operative when run to: retrieve and present a web page, for example, the web page 12, of a website; obtain a request from the website requesting performance of a CAPTCHA challenge process; and in response to the website requesting performance of the CAPTCHA challenge process, request the CAPTCHA challenge application 20 to perform the CAPTCHA challenge process. The web browser application 10 is operative to communicate with the Secure CAPTCHA challenge application 20 via an inter-process communication (IPC) (arrow 40 of FIG. 2). The web page 12 is rendered via a graphics layer 41 of the operating system and then via the graphics controller 34.

The Secure CAPTCHA challenge application 20 and the web browser application 10 are run as different processes by the processor 22. The secure CAPTCHA challenge application 20 is generally not a plug-in, add-in or extension of the web browser application 10. The secure CAPTCHA challenge application 20 is operative when run to obtain the request from the web browser application 10 to perform the CAPTCHA challenge process (block 44).

The secure CAPTCHA challenge application 20 is operative when run to request a CAPTCHA challenge test from the authentication server 16 (block 46); and obtain the CAPTCHA challenge test from the authentication server 16 (block 48). Communication between the secure CAPTCHA challenge application 20 and the authentication server 16 is generally performed via a secure channel.

The secure CAPTCHA challenge application 20 is operative when run to render the CAPTCHA window 28 including the CAPTCHA challenge test for output to display device 32 over the web page 12 of the website (block 50) taking into account: a size and position of a browser window 30 including the web page 12; and a size, position of one or more overlays (if they exist) on the browser window 30. The rendering of the CAPTCHA window 28 is generally not performed by the web browser application 10. Additionally, the web browser application 10 generally does not control the CAPTCHA window 28. The secure CAPTCHA challenge application 20 is operative when run to track at least one of the following: a size and position of the browser window 30; and a size, position of one or more overlays (if they exist) on the browser window 30 (block 54). The secure CAPTCHA challenge application 20 is operative when run to move the CAPTCHA window 28 when the browser window 30 is moved or resized (block 56) and render the CAPTCHA window 28 over the web page 12 so that the CAPTCHA window 28 appears to be an integral part of the web page 12 even if at least one of the following changes: the size of the browser window 30; the position of the browser window 30; and a size, position of one or more overlays (if they exist) on the browser window 30. Alternatively, the CAPTCHA window 28 may be rendered by the secure CAPTCHA challenge application 20 without consideration to the size, position or overlays of the web page 12 and simply render the CAPTCHA window 28 as a pop-up at any position on the screen of the display device 32.

The graphics controller 34 is operative to process the CAPTCHA window 28 for output to the display device 32. The CAPTCHA window 28 is typically not rendered by the graphics layer 41 of the operating system. The CAPTCHA window 28 is typically merged with the rest of the desktop within the graphics controller 34 and so the CAPTCHA window 28 is generally not accessible to the operating system or left in memory in the clear (unencrypted). Anti-grabbing may be implemented using suitable anti-grabbing software for example, but not limited to, Intel Insider or PAVP. The CAPTCHA window 28 is typically not merged with the rest of the desktop outside the graphic controller, e.g., in the graphics layer 41 of the operating system, as mentioned above.

The secure CAPTCHA challenge application 20 is operative when run to obtain a user response to the CAPTCHA challenge test (block 58) for example, but not limited to, via the input device 36. The secure CAPTCHA challenge application 20 is operative when run to send a value based on the user response to the authentication server 16 via the secure channel (block 60); obtain a response, typically including an authentication token and/or cookie, from the authentication server 16 via the secure channel authenticating the user response (block 62); and send the authentication token and/or cookie to the web browser application 10 for forwarding to the website (block 64). It may be appreciated by one ordinarily skilled in the art that a single secure CAPTCHA challenge application 20 may serve any number of different browsers, regardless of the features or implementation details of the different browsers.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising a processor; and a memory to store data used by the processor, wherein the processor is operative to:
 run a web browser application that is operative when run to:
  retrieve and present a web page of a website in a browser window; and
  in response to the website requesting performance of a Completely Automated Public Turing test to tell Computers and Humans Apart (CAPTCHA) challenge process, request a CAPTCHA challenge application to perform the CAPTCHA challenge process; and
 run the CAPTCHA challenge application separately from the web browser application so that the CAPTCHA challenge application can implement defenses that are stronger than the defenses allowed by the web browser application, the defenses including at least one of an anti-grabbing defense or an anti-debugging defense, wherein the CAPTCHA challenge application is operative when run to:
  obtain the CAPTCHA challenge test from an authentication server in response to the request to perform the CAPTCHA challenge process;
  render a CAPTCHA window including the CAPTCHA challenge test separately from the browser window, but over the web page included in the browser window;
  protect the CAPTCHA challenge application with the defenses and/or a secure enclave which is not accessible to an operating system on which the web browser application runs and other applications;
  move the CAPTCHA window to track a size and/or a position of the browser window so that the CAPTCHA window appears to be integrated into the web page as the browser window is resized and/or repositioned;
  send, to the authentication server, a value based on a user response to the CAPTCHA challenge test; and
  obtain a response from the authentication server authenticating the user response.

2. The system according to claim 1, wherein the web browser application does not control the CAPTCHA window.

3. The system according to claim 1, wherein: the CAPTCHA challenge application is further operative to:
 obtain an authentication token and/or a cookie from the authentication server authenticating the user response; and
 send the authentication token and/or the cookie to the web browser application for forwarding to the website.

4. The system according to claim 1, wherein, in sending, the CAPTCHA challenge application is operative to send the value to the authentication server via a secure channel.

5. The system according to claim 1, wherein the web browser application is operative to communicate with the CAPTCHA challenge application via an inter-process communication.

6. The system according to claim 1, wherein the CAPTCHA challenge application is further operative to:
 track a presence and a position of at least one overlay on the browser window; and
 render the CAPTCHA window over the web page so that the CAPTCHA window appears to be integrated into the web page when the at least one overlay is on the browser window.

7. The system according to claim 1, further comprising a graphics controller, wherein:
 the processor is operative to run the operating system; and
 the graphics controller is operative to process the CAPTCHA window for output to the display device, wherein the processing of the CAPTCHA window by the graphics controller is not accessible to the operating system.

8. The system according to claim 1, wherein the defenses that are stronger than the defenses allowed by the web browser application included defenses designed to address attacks by an adversary who has full privileged access on the processor.

9. A method comprising:
 in response to a request from a web browser application to perform a Completely Automated Public Turning test to tell Computers and Human Apart (CAPTCHA) challenge process, obtaining a CAPTCHA challenge test from an authentication server;
 rendering a CAPTCHA window including the CAPTCHA challenge test separately from a browser window in which the web browser application is presenting a web page of a website, so that defenses which are stronger than defenses allowed by the web browser application can be implemented on the CAPTCHA window, the defenses including at least one of an anti-grabbing defense or an anti-debugging defense;
 protecting the CAPTCHA challenge application with the defenses and/or a secure enclave which is not accessible to the operating system on which the web browser application runs and other applications;
 moving the CAPTCHA window to track a size and/or a position of the browser window so that the CAPTCHA window is rendered over the web page included in the browser window and appears to be integrated into the web page as the browser window is resized and/or repositioned;
 sending, to the authentication server, a value based on a user response to the CAPTCHA challenge test; and
 obtaining a response from the authentication server authenticating the user response.

10. The method according to claim 9, wherein the web browser application does not control the CAPTCHA window.

11. The method according to claim 9, further comprising:
 obtaining an authentication token and/or a cookie from the authentication server authenticating the user response; and
 sending the authentication token and/or the cookie to the web browser application for forwarding to the website.

12. The method according to claim 9, wherein the sending further comprises:
 sending the value to the authentication server via a secure channel.

13. The method according to claim 9, further comprising:
 obtaining the request from the web browser application via an inter-process communication.

14. The method according to claim 9, further comprising:
 tracking a presence and a position of at least one overlay on the browser window; and
 rendering the CAPTCHA window over the web page so that the CAPTCHA window appears to be integrated into the web page when the at least one overlay is on the browser window.

15. The method according to claim 9, wherein the defenses which are stronger than defenses allowed by the web browser application can be implemented on the CAPT- CHA window include defenses designed to address attacks by an adversary who has full privileged access on the processor.

16. A software product, comprising a non-transient computer-readable medium in which program instructions are stored, which instructions, when read by a processor, cause the processor to:
  in response to a request from a web browser application to perform a Completely Automated Public Turning test to tell Computers and Human Apart (CAPTCHA) challenge process, obtain a CAPTCHA challenge test from an authentication server;
  render a CAPTCHA window including the CAPTCHA challenge test separately from a browser window in which the web browser application is presenting a web page of a website, so that defenses which are stronger than defenses allowed by the web browser application can be implemented on the CAPTCHA window, the defenses including at least one of an anti-grabbing defense or an anti-debugging defense;
  protect the CAPTCHA challenge application with the defenses and/or a secure enclave which is not accessible to an operating system on which the web browser application runs and other applications;
  move the CAPTCHA window to track a size and/or a position of the browser window so that the CAPTCHA window is rendered over the web page included in the browser window and appears to be integrated into the web page as the browser window is resized and/or repositioned;
  send, to the authentication server, a value based on a user response to the CAPTCHA challenge test;
  obtain a response from the authentication server authenticating the user response.

17. The software product of claim 16, wherein the instructions, when read by a processor, further cause the processor to:
  track a presence and a position of at least one overlay on the browser window; and
  render the CAPTCHA window over the web page so that the CAPTCHA window appears to be integrated into the web page when the at least one overlay is on the browser window.

18. The software product of claim 16, wherein the defenses which are stronger than defenses allowed by the web browser application can be implemented on the CAPTCHA window include defenses designed to address attacks by an adversary who has full privileged access on the processor.

19. The software product of claim 16, wherein the web browser application does not control the CAPTCHA window.

20. The software product of claim 16, wherein the instructions, when read by a processor, further cause the processor to:
  obtain the request from the web browser application via an inter-process communication.

* * * * *